United States Patent [19]

Coulon

[11] Patent Number: 5,340,530
[45] Date of Patent: Aug. 23, 1994

[54] METHOD OF FORMING AN INSERT ON A PART TO BE CLAD THAT IS MADE OF STEEL OR OF TITANIUM ALLOY

[75] Inventor: André Coulon, Bessoncourt, France

[73] Assignee: GEC Alsthom Electromecanique SA, Paris, France

[21] Appl. No.: 70,924

[22] Filed: Jun. 4, 1993

[30] Foreign Application Priority Data

Jun. 5, 1992 [FR] France ................ 92 06861

[51] Int. Cl.$^5$ .............................................. B22F 7/08
[52] U.S. Cl. ........................................ 419/5; 419/8; 419/49; 428/533; 428/554
[58] Field of Search .............. 419/5, 8, 49; 428/553, 428/554; 416/224; 204/272; 29/156–157

[56] References Cited

U.S. PATENT DOCUMENTS

| Re. 32,389 | 4/1987 | Becker et al. ................ 29/157.1 R |
| 4,137,619 | 2/1979 | Beltran et al. ................ 29/156.8 H |
| 4,584,081 | 4/1986 | Coulon .............................. 204/272 |
| 4,795,313 | 1/1989 | Coulon .............................. 416/224 |
| 4,832,993 | 5/1989 | Coulon .............................. 427/53.1 |
| 4,839,237 | 6/1989 | Coulon et al. ...................... 428/610 |
| 4,844,863 | 7/1989 | Miyasaka et al. .................... 419/8 |

FOREIGN PATENT DOCUMENTS 0151103 8/1985 European Pat. Off. .
0401187 12/1990 European Pat. Off. .
2133300 3/1972 Fed. Rep. of Germany .

OTHER PUBLICATIONS

Patent Abstracts of Japan, vol. 13, No. 170 (M-817) Apr. 21, 1989 & JP-A-10 05 701 (Kubota) Jan. 10, 1989.
Patent Abstracts of Japan, vol. 4, No. 105 (M-023) Jul. 26, 1980 & JP-A-55 062 103 (Kobe Steel) May 10, 1980.

*Primary Examiner*—Donald P. Walsh
*Assistant Examiner*—John N. Greaves
*Attorney, Agent, or Firm*—Sughrue, Mion, Zinn, Macpeak & Seas

[57] ABSTRACT

A method of manufacturing a protective insert (1) on a metal part (2) in which a foil (3) that serves as a barrier for gases is fixed between the part (2) and the insert (1), the edges of a metal capsule (4) are fixed to the edges of the foil (3), the space (5) between the capsule (4) and the part (2) is filled with a metal or ceramic powder and the ends of the capsule (4) are closed, the part (2) together with the filled capsule (4) are inserted in an isostatic pressing oven under a controlled atmosphere, with the pressure and the temperature being selected so that the powder is pressed in situ. The part (2) is cooled and then the capsule is removed before giving the part (2) together with its insert (1) the desired final shape. The method is very simple and it enables reliable products to be obtained.

7 Claims, 1 Drawing Sheet

METHOD OF FORMING AN INSERT ON A PART TO BE CLAD THAT IS MADE OF STEEL OR OF TITANIUM ALLOY

The present invention relates to installing protective cladding, generally of hard material for mitigating wear effects such as abrasion, friction, and erosion, on mechanical components that are particularly subject thereto, such as turbine vanes and the admission members of power stations.

In a method known from Document EP-A0 151 103 (Example 3), a solid cylinder of martensitic steel or titanium alloy is inserted into a metal capsule in which the space between the capsule and cylinder is filled with a metal or ceramic powder. The ends of the capsule are closed, the unit is placed in an isostatic pressing oven under a controlled atmosphere, with pressure and temperature being chosen so that the powder is pressed in situ, the unit is cooled and removed from the oven for final shaping.

It has been observed that an insert made using a powder includes a significant fraction of gas: oxygen and nitrogen. Unfortunately, these gases tend to migrate into the substrate and make it brittle.

The method of the invention is characterized in that an overlapping metal foil is mechanically fixed on the portion of the part that is to be clad, said foil having a thickness lying in the range 0.1 mm to 0.3 mm and being constituted by elements that are compatible with the part and that are suitable during the pressing operation for generating intermetallic phase compounds that form a barrier between the insert and the part, the foil having a melting point that is 20° C. to 50° C. greater than the pressing temperature used; and in that the edges of the capsule are subsequently fixed to the edges of the foil.

The change in the structure of the foil that occurs during the treatment that causes the intermetallic phase compounds to be created serves to obtain a barrier against the diffusion of gases from the insert into the part.

When the part to be clad is made of martensitic steel, the foil may be constituted by pure copper, nickel with indium, or nickel with tin. It may also be constituted by an alloy of two or three of the following elements: Ni, Cu, Al; and preferably 70% Ni, 15% Cu, 15% Al.

When the part is made of titanium alloy, the foil is constituted by titanium with indium or by an alloy of two or three of the following elements: Ni, Ti, Al; and preferably 50% Al, 25% Ni, 25% Ti.

For example, the part to be clad may be a turbine vane.

The invention is described below in greater detail with reference to a particular embodiment given by way of non-limiting example and shown in the accompanying drawing.

The method of the invention is described for the case where the leading edge 1 of a turbine blade 2 that is made of martensitic steel and that is subject to erosion is clad by an insert 1.

Figure 1:
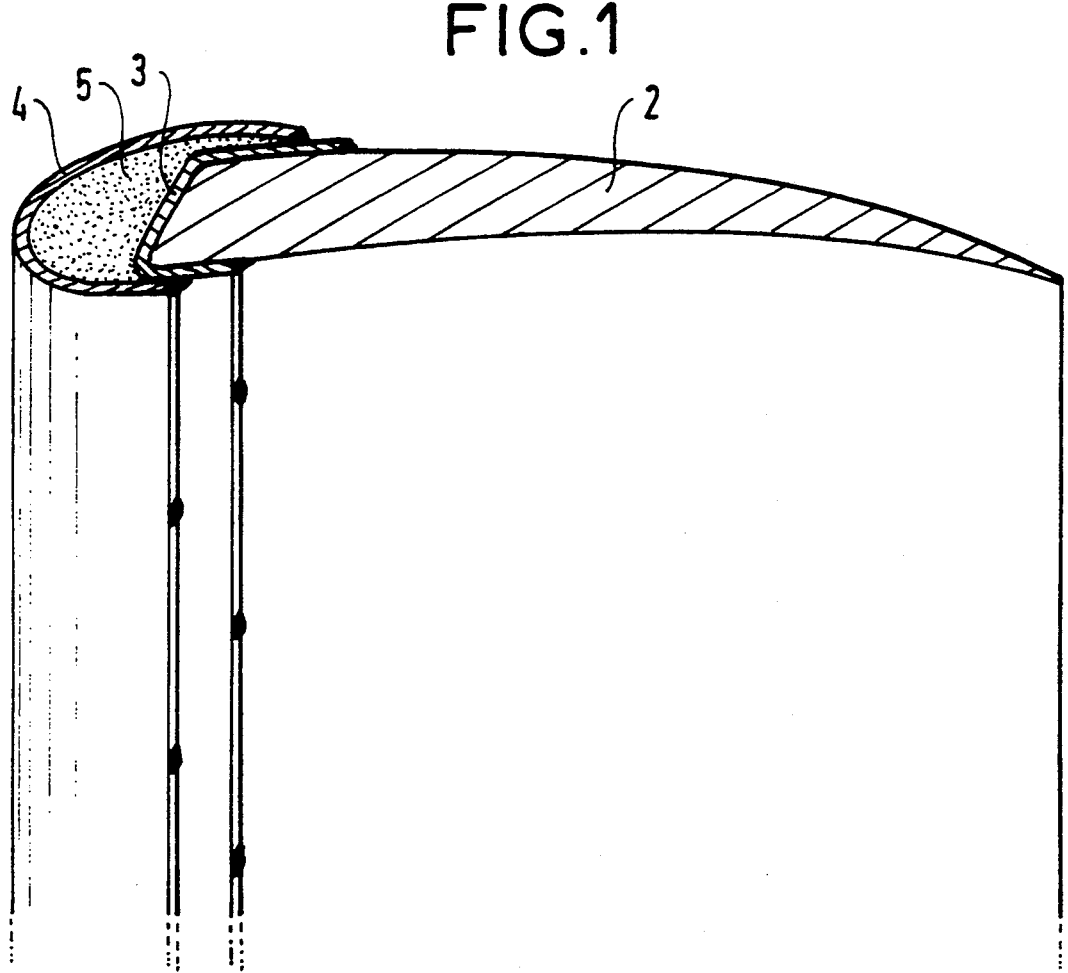
FIG. 1 shows a vane provided with a capsule.

The surface of the leading edge is ground so as to present a flat (see FIG. 1).

A foil 3 is applied to the entire zone to be protected merely by applying pressure thereto and leaving overlaps of 5 mm around its entire perimeter. The foil 3 is fixed to the blade by tacking using spot welds or mechanical means (e.g. molybdenum clamps).

The foil is of the high temperature brazing type, its thickness lies in the range 0.1 mm to 0.3 mm, and it is constituted by an alloy of Ni, Cu, and Al (70% Ni, 15% Cu, and 15% Al). Its melting temperature may lie in the range 1,220° C. to 1,260° C.

Thereafter, a thin walled capsule 4 is installed (wall thickness <3/10ths of a millimeter) and is tacked to the projecting portion of the foil 3.

The capsule 4 has the same shape as the finished profile of the leading edge. The space 5 between the capsule 4 and the foil 3 has a thickness that may lie in the range a few tenths of a millimeter to a few millimeters. Metal powder (mono- or multiphase alloys) is then inserted in the space 5 after which the ends of the capsule 4 are closed.

The vane 2 is then inserted in an isostatic pressing oven under a controlled atmosphere to perform hot isostatic pressing (HIP). For a period of 120 minutes, the pressure is kept constant at 1,500 arm for steel and 1,800 atm for titanium alloy, and the temperature is also maintained constant at 1,200° C. for steel and 1,050° C. for titanium alloy, being 20° C. to 60° C. below the melting temperature of the foil 3.

The vane 2 is then removed from the oven and after cooling, the capsule 4 is removed.

Figure 2:
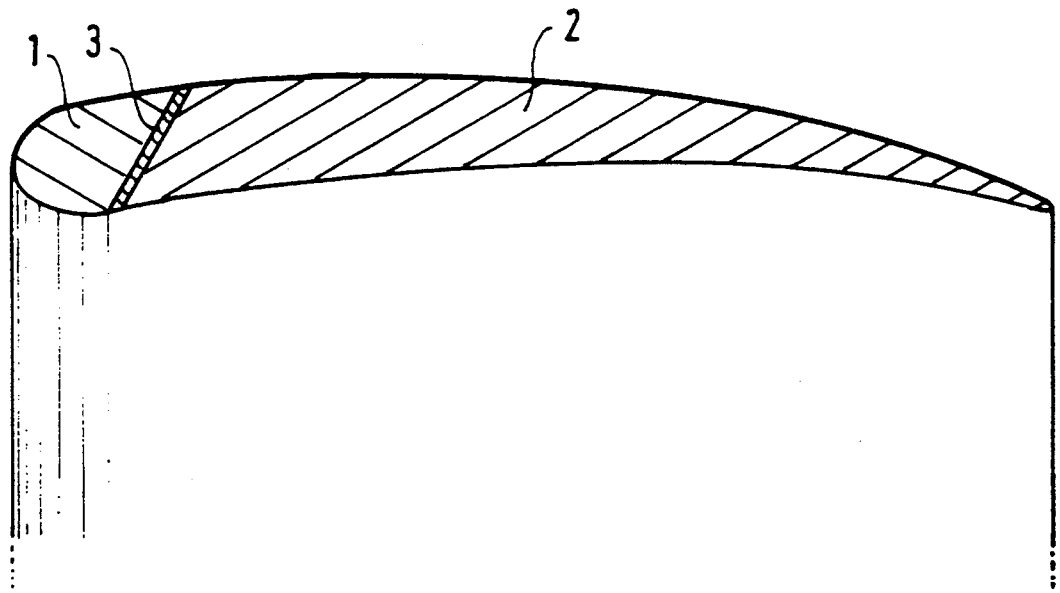
FIG. 2 is a section through the vane fitted with its insert.

All traces of the tacking and of excess portions of foil 3 are eliminated by proximity grinding (see FIG. 2).

The vane 2 thus fitted with its insert is then inserted into final calibration tooling that is preferably isothermal.

The vane is then subjected to the end of the normal range of operations (heat treatments, finishing, etc. . . . ).

The calibration operation that enables dimensions to be achieved under acceptable conditions of deformation (work hardening) and without further machining is not essential, it may be preferable to perform a subsequent machining operation.

When the part to be clad is made of steel, it is possible to choose an insert that is made of a hard material such as stellite, with the powder filling the capsule then being constituted by cobalt-based alloys embedded in a matrix.

This steel part for a steam turbine may not only be a vane where the leading edge of the fin or of the caps may be clad, but it may also be a guide or a seat in an admission member.

I claim:

1. A method of manufacturing a protective insert (1) on a metal part (2) made of martensitic steel or of titanium alloy, by using a metal capsule (4) in which the space (5) between the capsule (4) and the part (2) is filled with a metal or ceramic powder whose composition corresponds to the composition desired for the insert (1), the ends of the space (5) are closed, the part (2) together with the filled capsule (4) are inserted in an isostatic pressing oven under a controlled atmosphere, the pressure and the temperature being selected so that the powder is pressed in situ, the part (2) is cooled and then the capsule (4) is removed before final shaping of the part (2) fitted with the insert (1), characterized in that an overlapping metal foil (3) is mechanically fixed on the portion of the part (2) that is to be clad, said foil (3) having a thickness lying in the range 0.1 mm to 0.3 mm and being constituted by elements that are compatible with the part (2) and that are suitable during the pressing operation for generating intermetallic phase compounds that form a barrier between the insert (1) and the part (2), the foil having a melting point that is 20° C. to 50° C. greater than the pressing temperature used; and in that the edges of the capsule (4) are subsequently fixed to the edges of the foil (3).

2. A method according to claim 1 for a part (2) of martensitic steel, characterized in that the foil (3) is made of pure copper, of nickel with indium, or of nickel with tin.

3. A method according to claim 1, for a part (2) of martensitic steel, characterized in that the foil (3) is constituted by an alloy of two or three of the following elements: Ni, Cu, Al.

4. A method according to claim 3, characterized in that the alloy is constituted by 70% Ni, 15% Cu, 15% Al.

5. A method according to claim 1 for a part (2) made of titanium alloy, characterized in that the foil (3) is constituted by titanium with indium.

6. A method according to claim 1 for a part (2) made of titanium alloy, characterized in that the foil (3) is constituted by an alloy of two or three of the following elements: Ni, Ti, Al.

7. A method according to claim 6, characterized in that the alloy of the foil (3) is constituted by 50% Al, 25% Ni, 25% Ti.

* * * * *